UNITED STATES PATENT OFFICE.

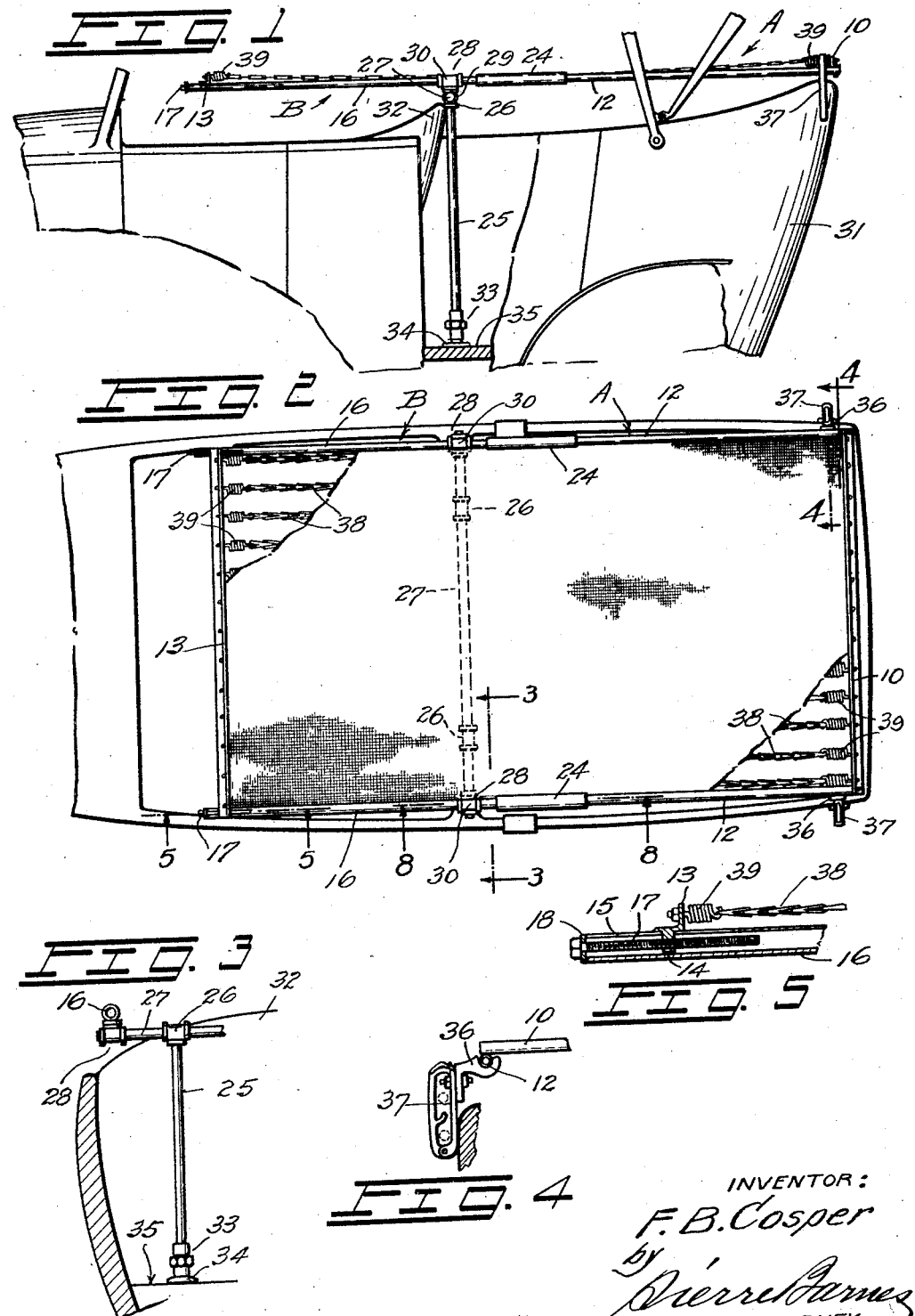

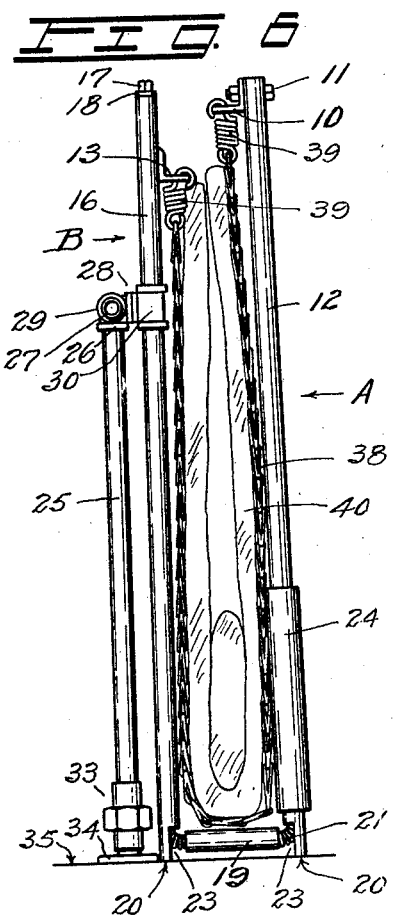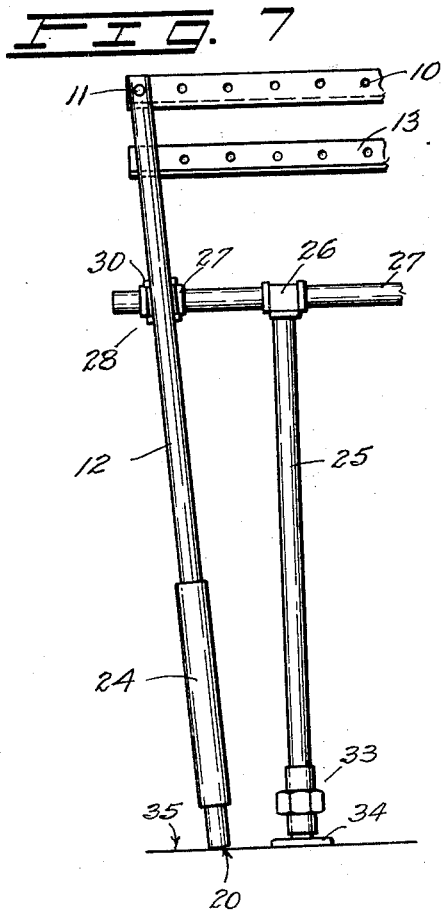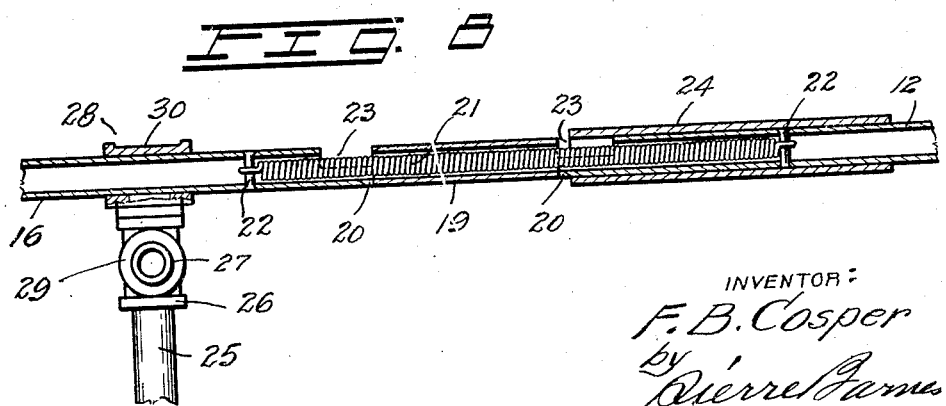

FRED B. COSPER, OF SEATTLE, WASHINGTON.

AUTOMOBILE BED.

1,417,802.  Specification of Letters Patent.  Patented May 30, 1922.

Application filed August 1, 1921. Serial No. 488,786.

*To all whom it may concern:*

Be it known that I, FRED B. COSPER, a citizen of the United States, residing at Seattle, in the county of King and State of Washington, have invented certain new and useful Improvements in Automobile Beds, of which the following is a specification.

This invention relates to folding beds for use in automobiles.

An object of my invention is to provide a strong and inexpensively constructed bed of this character which is adapted to be folded to occupy a small space in a car, and when extended will assume a horizontal position above the car seats.

Another object of the invention is to provide a folding bed which is positively prevented from collapsing when in its extended position.

A further object of the invention is to provide a folding bed which may be conveniently installed in or removed from an automobile.

Still other objects and advantages of the invention will appear from the following description.

In the accompanying drawings,—

Figure 1 is a view in side elevation of my improved bed applied to an automobile body, said bed being shown in its extended position. Fig. 2 is a plan view of the same, and including a canvas cover, not shown in Fig. 1. Figs. 3, 4 and 5 are detail sectional views through 3—3, 4—4 and 5—5 of Fig. 2. Fig. 6 is a side elevation of the bed in its folded position. Fig. 7 is a fragmentary front elevational view of Fig. 6, the fabric and bedding being omitted in Fig. 7. Fig. 8 is a detail sectional view through 8—8 of Fig. 2.

According to the present invention I provide a bed frame comprising head and foot sections which are indicated, generally, by A and B in Figs. 1, 2 and 6. Said head section has a frame of a transverse bar 10 which is rigidly connected as by bolts 11, or an equivalent, to the rear ends of tubular side rails 12.

The foot section B has its frame formed with a transverse bar 13 having apertured lugs 14 which extend through longitudinal slots 15 in the rear ends of tubular side rails 16.

The apertures of the respective lugs are threaded for engaging headed screws 17 extending through caps 18 provided on the respective rails 16.

19 represents a relatively short spacing tube interposed between the adjacent extremities 20 of the complementary rail members 12 and 16 at each side of the frame.

Such complementary rail members are hingedly coupled with each other by means of a close wound coil spring 21 extending through the respective spacing tube into the members 12 and 16 and secured at its ends to pins 22 extending diametrically through said members as shown in Fig. 8. The adjacent ends of the complementary rail members are cut away or formed to provide openings 23 in the peripheries of the rails to accommodate the flexing of the spring 21 when the bed is in the folded position in which it is represented in Fig. 6.

When the bed is extended, as shown in Figs. 1 and 2, I employ at each side a sleeve 24 which is movable telescopically over the spacing and rail tube joints to provide a rigid connection between the complementary rail members and maintain the same in axial alignment with each other.

Intermediate its length, the bed frame is pivotally connected to a supporting stand which is advantageously made of pipes and consisting of two post elements 25 which are secured by means of fittings 26 to a transversely arranged pipe element 27. These elements 27 are pivotally connected to the bed frame by means of couplings 28, each having as best shown in Fig. 6, sleeve elements 29 and 30 which are arranged at right angles to each other to respectively receive the stand element 27 and a side rail member 16 of said frame.

In an automobile body 31 having two seats, the stand above referred to is located to the rear of the back 32 (Fig. 1) of the forward seat and is detachably secured in place by means of unions 33 whose associated elements are respectively secured to posts 25 and attachments 34 which latter are secured to the floor 35 of car body 31.

The head end of the bed frame is, moreover, supported by having the side rails 12 thereof seat in stationary brackets such as 36 which, as shown in Fig. 4, are secured to the devices 37 such as usually provided at opposite sides of the body 31 to receive the collapsible frame work of a car-top.

The bed frame is provided with any well known or suitable resilient means upon which a mattress and bedding is supported as illustrated, such mattress support consists of a plurality of chains 38 disposed longitudinally of the frame and in parallel relations with each other, said chains being connected to helical springs 39 which, in turn, are connected to the transverse bars 10 and 13 of the bed frame. When the bed is to be folded the bar 13 is moved toward the other bar 10 by suitably manipulating the screws 17 whereby the chains 38 are rendered slack. After the bed is extended said screws are employed to adjust the bar 13 for rendering the chains 38 taut. In adjusting the frame into either its horizontal extended position or into its vertical folded position, the frame rails 12 are slidably moved through the sleeve elements 30 of the respective coupling 28.

For changing the bed into either of these positions, the stand element 27 serves as a pivotal bearing for the frame.

When in its folded or vertical position as illustrated in Figs. 6 and 7, the two sections A and B are held apart by means of the springs 21 and spacing tubes 19 to afford room for bedding as indicated by 40 in Fig. 6.

By the provision of the peripheral openings 23 in the frame rail members 12 and 16 to accommodate the respective springs 21, the extremities 20 of such members seat upon the car floor 35 to firmly support the weight of the frame, bedding, etc., when the bed is carried in its folded position in the car.

The construction and operation of the invention will, it is believed, be understood from the foregoing description.

What I claim, is:—

1. In an automobile bed, a supporting stand, a bed frame comprising head and foot sections, resilient means connecting said sections in foldable relations with respect to each other, one of said sections being pivotally connected to said stand, and sleeve devices engaging members of both of said sections for releasably securing the frame in its extended position.

2. In an automobile bed, a supporting stand, a bed frame comprising two foldably connected sections, means engageable with members of both of said sections for releasably retaining the same in aligned relations with each other, means pivotally connected to said stand and slidably connected to said frame whereby the frame is movable in both vertical and horizontal directions with respect to said stand.

3. In an automobile bed, a supporting stand, a bed frame comprising two foldably connected sections, means engageable with members of both of said sections for releasably retaining the same in aligned relations with each other, means pivotally connected to said stand and slidably connected to one of said frame sections whereby the frame is movable in both vertical and horizontal directions with respect to said stand.

4. In an automobile bed, a supporting stand, means for detachably securing the same upon the floor of an automobile body, a bed frame comprising two foldably connected sections, means engageable with members of both of said sections for releasably retaining the same in aligned relations with each other, means pivotally connected to said stand and slidably connected to one of said frame sections whereby the frame is movable in both vertical and horizontal directions with respect to said stand.

5. An automobile bed having a stand, means separably connected to said stand for securing the latter to the floor of an automobile body, a bed frame comprising head and foot sections constructed of tubular complementary side rails, and transverse bar members, the bar member of one of said sections being rigidly secured to the respective side rails, the bar of the other sections being connected to the side rails thereof for movement longitudinal of the bed, flexible mattress supporting devices connected to both of said bars, screw devices for adjusting the aforesaid movable bar to regulate the mattress supporting devices, flexible means extending into the complementary side rails for foldably connecting said sections together, means pivotally connected to said stand and connected for axial movements to the side rails of one of said sections whereby said bed may selectively be supported upon said floor in a substantially vertical position when folded or be supported by said stand, and means engageable by one of sections and acting supplementary to said stand for retaining said frame horizontally when in its extended position.

Signed at Seattle, Washington, this 21st day of July, 1921.

FRED B. COSPER.

Witnesses:
PIERRE BARNES,
MARGARET G. SUPPLE.